Oct. 23, 1956     A. W. WHITTARD     2,767,622
GOLF BALL MOLD CUTTING MACHINE
Filed Aug. 6, 1953     5 Sheets-Sheet 1

INVENTOR.
Arthur W. Whittard
BY
Moore, Nolte, Cruve & Berry
ATTORNEYS

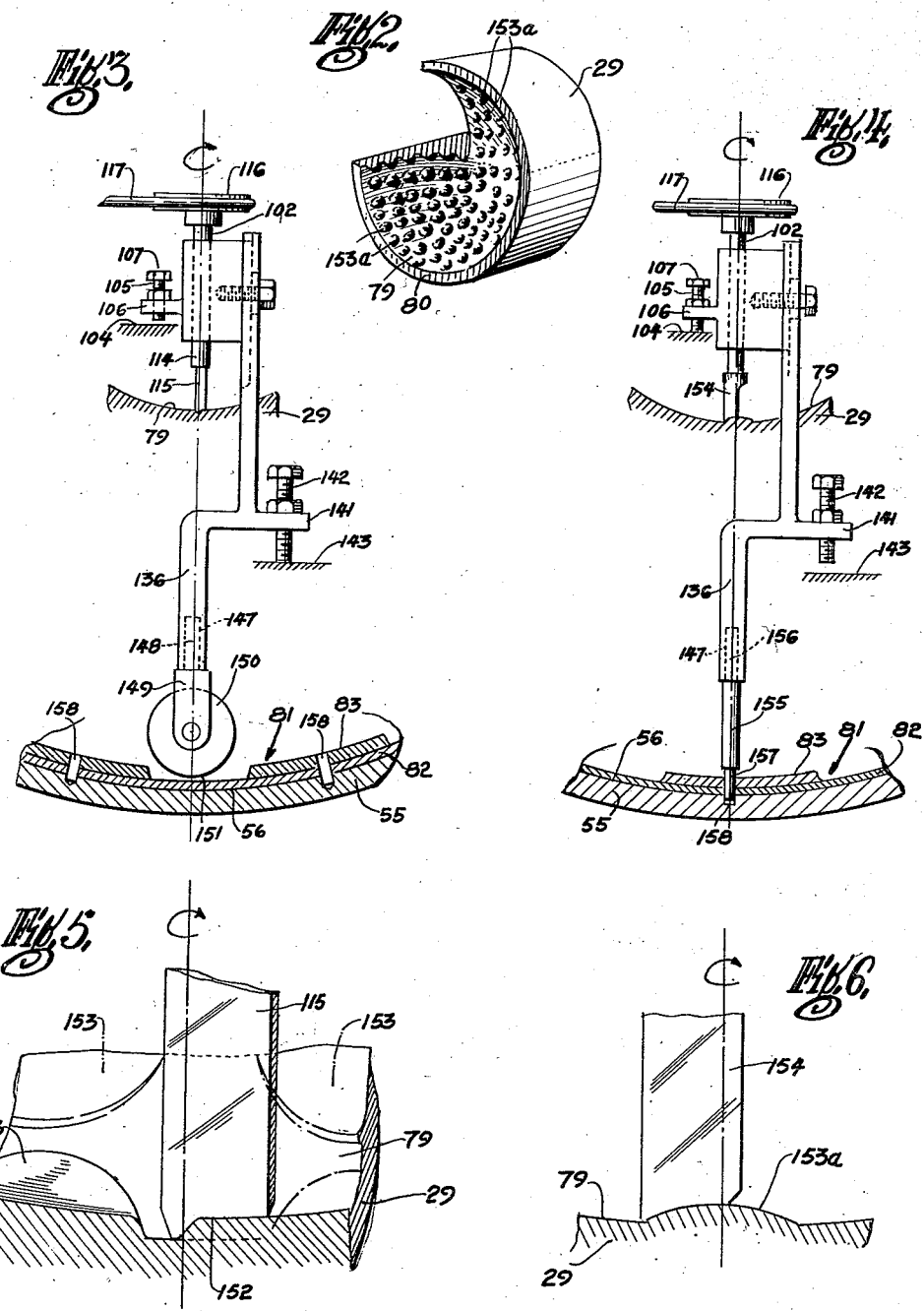

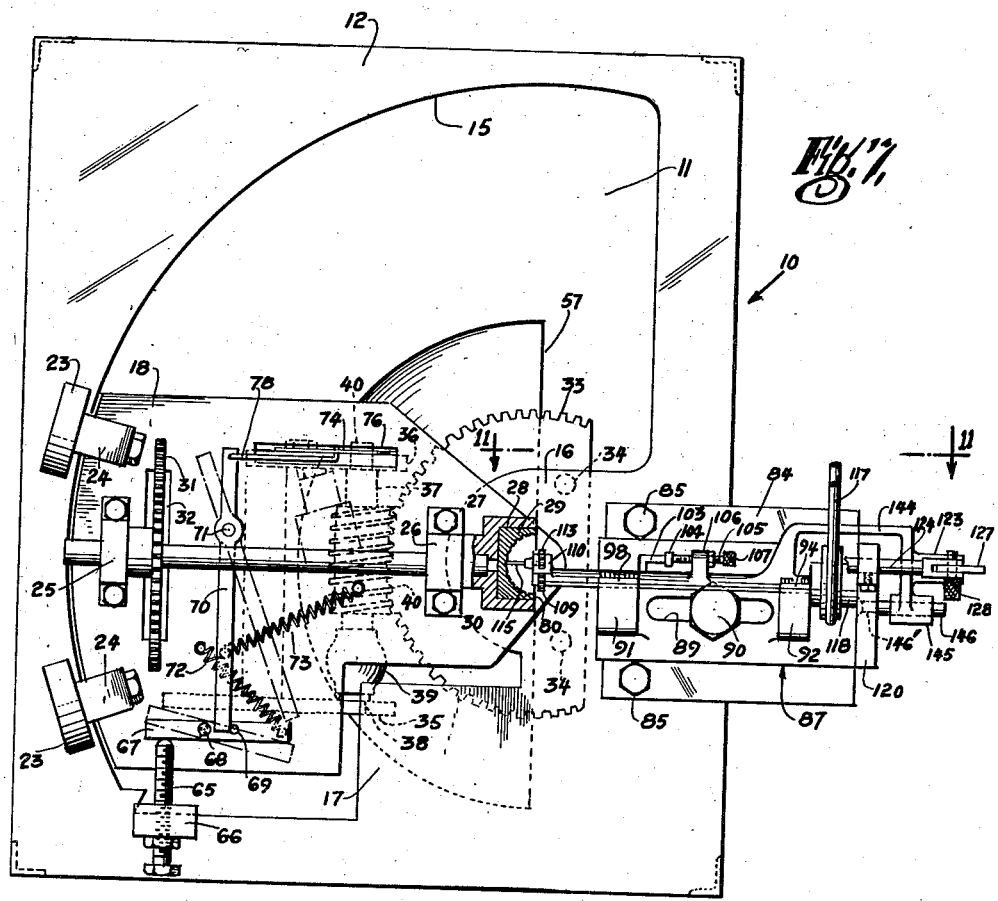
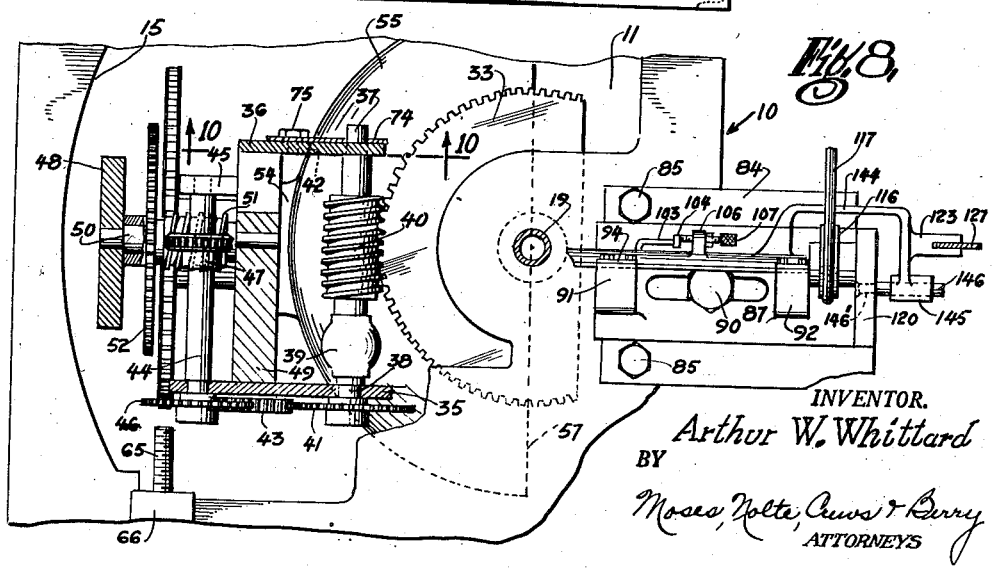

INVENTOR.
Arthur W. Whittard
BY
Moses, Nolte, Cruvo & Berry
ATTORNEYS

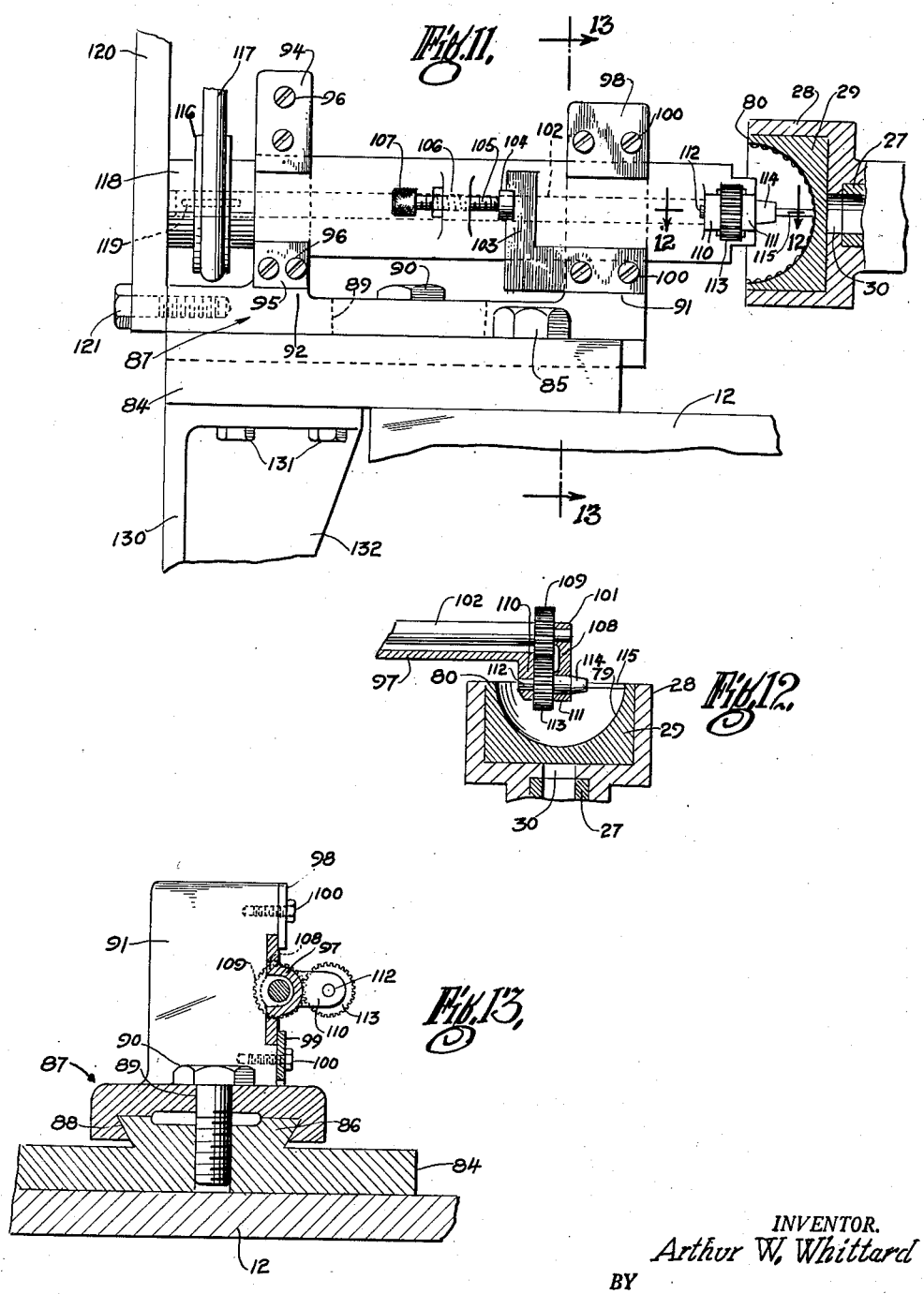

United States Patent Office 2,767,622
Patented Oct. 23, 1956

2,767,622

GOLF BALL MOLD CUTTING MACHINE

Arthur W. Whittard, New York, N. Y., assignor to Florence K. Dole, New York, N. Y.

Application August 6, 1953, Serial No. 372,637

10 Claims. (Cl. 90—13.7)

This invention relates to golf ball mold cutting devices.

It is an object of the present invention to provide a golf ball mold cutting machine adapted to be used with stock of tool steel or similar hard material, providing cheaply and quickly a mold of greater strength and durability.

It is another object of the present invention to provide a golf ball mold cutting machine of the above type wherein the rotation of the master design and stock is synchronized and automatic, increasing the accuracy and speed of the machine.

It is still another object of the present invention to provide a golf ball mold cutting machine of the above type which may be readily and easily operated by the average mechanic without requiring specialized training.

It is still another object of the present invention to provide a golf ball mold cutting machine of the above type wherein the position of the cutting tool on the mold stock is accurately controlled as to depth of cut by a stylus mechanism in contact with the face of the master design.

It is still another object of the present invention to provide a golf ball mold cutting machine of the above type wherein means are provided for imparting a perfect hemispherical surface to the mold blank or stock.

For other objects and a better understanding of the invention, reference may be had to the following detailed description taken in connection with the accompanying drawings in which:

Figure 2 is a fragmentary perspective view of a golf ball mold produced by the machine of Fig. 1;

Figure 3 is a diagrammatic view showing the manner of controlling the depth of cut of the cutting tool during the routing operation;

Figure 4 is a diagrammatic view showing the indexing of the cutting tool during the finishing operation;

Figure 5 is an enlarged fragmentary perspective view of the cutting tool used during the routing operation of Fig. 3;

Figure 6 is an enlarged fragmentary elevational view of another cutting tool used during the finishing operation of Fig. 4;

Figure 7 is a top plan view of the machine shown partly in section and illustrating in dotted outline the manner in which the worm driving the revolving platform is released to an inoperative position after the platform has rotated counter-clockwise through ninety degrees from its initial position;

Figure 8 is a transverse sectional view taken along the line 8—8 of Fig. 1;

Figure 11 is a rear side elevational view of a portion of the machine looking along the line 11—11 of Fig. 7, shown partly in section;

Figure 12 is a longitudinal sectional view taken along the line 12—12 of Fig. 11 but showing the cutting tool in the initial position of Fig. 9, and Figure 13 is a vertical sectional view taken along the line 13—13 of Fig. 11.

Figure 1:
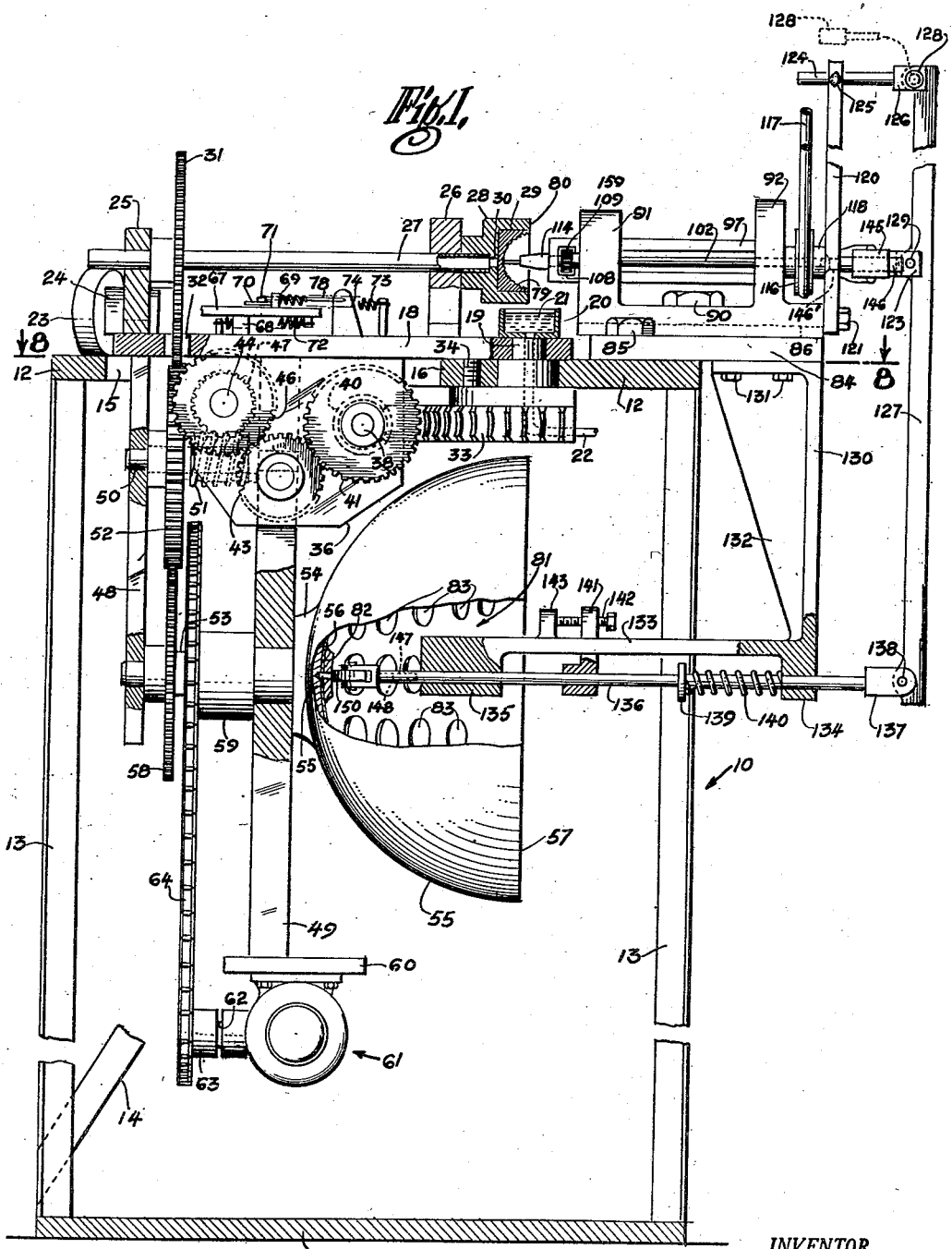
Figure 1 is a side view of a machine embodying the features of the present invention, shown partly in elevation and partly in section.

Referring now more in detail to the drawing, in which similar reference numerals identify corresponding parts throughout the several views, there is shown a main frame 10 consisting of a rectangular bottom plate 11 and a rectangular top plate 12 supported above the bottom plate 11 by means of the corner posts 13 of substantially L-shaped cross-section, substantially as illustrated. Diagonal braces 14 (Fig. 1) are provided to reinforce the posts 13.

Figure 9:
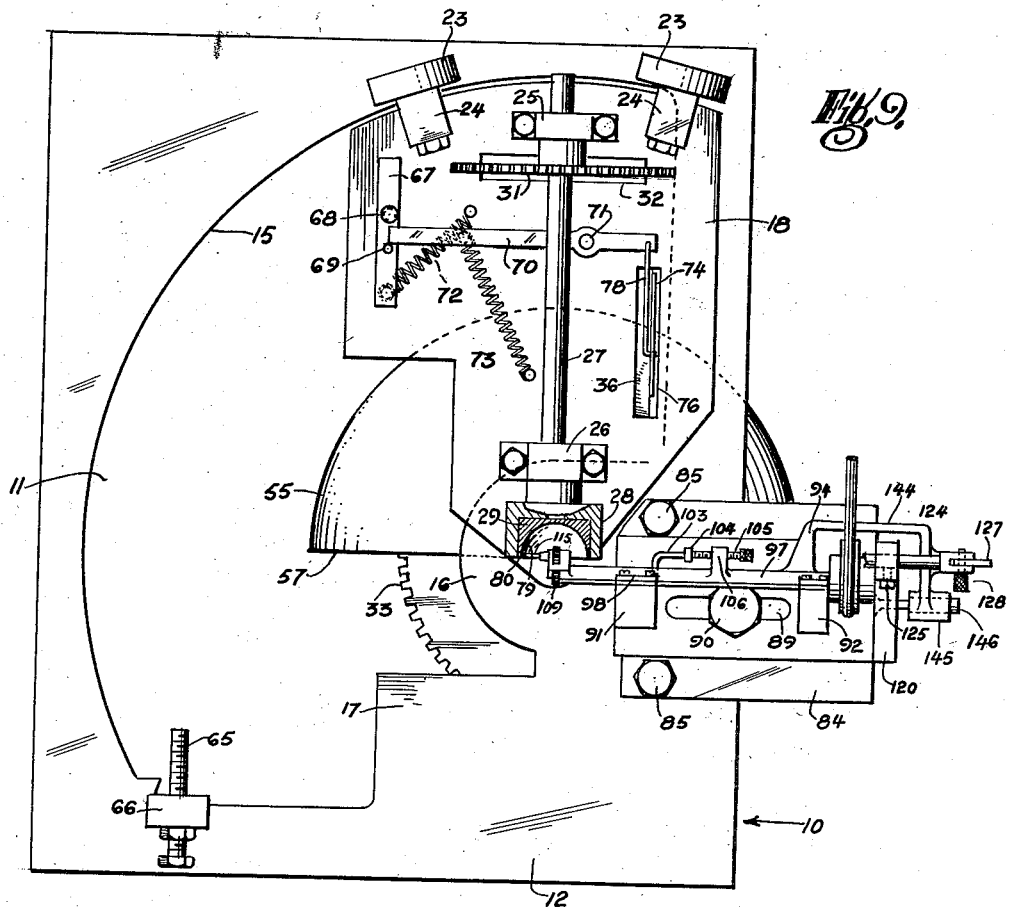
Figure 9 is a top plan view of the machine and showing the revolving platform in its initial or starting position.
Figure 10:
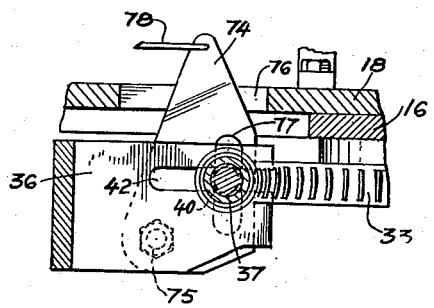
Figure 10 is a vertical sectional view taken along the line 10—10 of Fig. 8.

The top plate 12 is provided with an arcuate cut out 15 formed with a semicircular tongue 16 and a rectangular corner 17 (Figs. 7 through 9) for a purpose which will hereinafter become clear.

The tongue 16 of the top plate 12 is provided with a turntable 18, the outer edge of the turntable 18 fitting within and lying just above the outer edge of the cut out 15. The turntable 18 is provided with an opening which receives the hub 19 (Fig. 1) of a bushing 20 which is suitably mounted within the center of the tongue 16, the hub 19 forming the bearing for the turntable 18. The bushing 20 is provided with a top opening 21 to collect lubricating oil, a conduit 22 communicating with the opening 21 and passing downwardly through the hub 19 and tongue 16 being provided for purposes of conducting the oil back to a pump or reservoir, not shown, from where it is pumped to the cutting tool, as will hereinafter become clear.

The outer arcuate edge of the turntable 18 is supported upon the top plate 12 by means of rollers 23 rotatably mounted in bearing blocks 24 fixedly secured to the upper surface of the turntable.

Uprights 25 and 26 are secured to the upper surface of turntable 18 and provide bearings for a hollow elongated shaft 27, the ends of shaft 27 extending outwardly beyond the uprights 25 and 26. The longitudinal axis of the shaft 27 passes through the center of the hub 19 and tongue 16, as will be apparent from an inspection of the drawing. The shaft 27 at its front end is provided with the head 28 keyed thereto for receiving the stock 29 in a friction fit when the machine is used for cutting golf ball molds (it will be readily apparent to those skilled in the art that other type of molds may be as readily produced). The recess in the head 28 is substantially cylindrical and receives therewithin the cylindrical mold stock 29 (Fig. 2). The head 28 is provided with an opening 30 connecting the recess of head 28 with the interior of hollow shaft 27 and permitting an elongated rod, not shown, to be inserted from the rear end of the shaft to knock the stock 29 out of the head 28 when desired.

A gear 31 is keyed to the shaft 27 adjacent the inner face of the upright 25, the platform 18 being provided with an elongated slot 32 receiving the bottom portion of the gear 31 therethrough.

A gear segment 33 is secured to the undersurface of tongue 16 by means of bolts 34, the center of the segment 33 being aligned vertically with the center of the semicircular tongue 16 and the pivotal axis of the turntable 18.

Depending vertical brackets 35 and 36, laterally spaced from each other are suitably secured to the undersurface of the turntable 18. As shown in Fig. 8, a shaft 37 is journalled at one end in the bracket 36 while a shaft 38 is journalled in the bracket 35 in alignment with the shaft 37, the shafts 37 and 38 being connected by a flexible coupling 39. The shaft 37 has keyed thereon a worm 40 in mesh with the gear segment 33.

A gear 41 is keyed on the outer end of the shaft 38.

The opening 42 in bracket 36 receiving the shaft 37 is elongated in a horizontal direction toward the rollers 23 to permit the shaft 37 to be rotated away from the gear segment 33 about the flexible coupling 39 in a manner to be hereinafter described.

An intermediate gear 43 is rotatably mounted on the outer face of bracket 35, this intermediate gear 43 being in mesh with the gear 41.

A shaft 44, parallel to the shafts 37 and 38, is rotatably mounted at one end in the bracket 35, the other end of the shaft 44 being rotatably mounted in an extension 45 of the bracket 36. A gear 46 is keyed onto the forward end of the shaft 44, the gear 46 being in mesh with the gear intermediate 43. A worm gear 47 is keyed to the shaft 44 intermediate the brackets 35 and 36.

A vertical, depending bracket 48 is suitably secured to the undersurface of the turntable 18 at right angles to the brackets 35 and 36, the bracket 48 extending below the lower edges of the brackets 35 and 36 a substantial amount.

A second vertical depending bracket 49 is suitably secured to the undersurface of turntable 18 at right angles and intermediate the brackets 35 and 36 (Fig. 8), the bracket 49 extending downwardly below the lower edge of the bracket 48 a substantial amount. It will be noted that the vertical edges of the bracket 49 are suitably secured to the inner faces of the brackets 35 and 36.

A shaft 50 disposed at right angles to the shafts 44, 37 and 38, is journalled at one end in the bracket 48 and at the other end in the bracket 49, the shaft 50 being disposed just below the shaft 44. A worm 51 is keyed to the shaft 50 intermediate the brackets 48 and 49, the worm 51 being in mesh with the worm gear 47.

A gear 52 is keyed to the shaft 50 intermediate the bracket 48 and the worm 51, the gear 52 being in mesh with the gear 31 extending downwardly through the slot 32 provided in turntable 18.

A shaft 53 (Fig. 1) is rotatably mounted at each end in the brackets 48 and 49 below the shaft 50, the front end of the shaft 53 being provided with a head 54 receiving a master support 55. The master support 55 is provided with a hemispherical concave face 56 on which a master design is secured.

It will be noted that the circular front face 57 of the master support 55 is aligned vertically with the circular front face of the work 29. Preferably the master support 55 is formed of machined aluminum.

A gear 58, equal in diameter to the gear 31, is keyed to the shaft 53 adjacent the bracket 48, the gear 58 being in mesh with the gear 52.

A sprocket 59 is keyed to the shaft 53 intermediate the gear 58 and bracket 49.

A horizontal platform 60 is suitably secured to the bottom of the depending bracket 49, a motor 61 being suitably secured to the undersurface of the platform 60 and including a drive shaft 62. A sprocket 63 is keyed to the shaft 62 and is connected to the sprocket 59 by means of a chain 64.

Thus, during operation of the motor 61, the sprocket 63 will drive the sprocket 59 by means of the chain 64, imparting rotary motion to the shaft 53 and thereby the master support 55 and gear 58. The rotation of gear 58 causes the shaft 50 to rotate through the gear 52, thus turning the worm 51 as well as the gear 31. The motion of the worm 51 turns the worm gear 47 which causes the gear 46 to rotate. Rotation of gear 46 is transmitted to gear 41 through the intermediate gear 43, causing the worm 40 to revolve. The turning of the worm 40 causes the former to move around the gear segment 33 from the initial position of Fig. 9 to the position of Fig. 7, or in other words causing the turntable 18 to rotate through ninety degrees in a counter-clockwise direction.

It will be noted that the turntable 18 is pivoted on the central vertical axis of the master support 55.

The rotation of the gear 31 referred to above causes the shaft 27 to revolve, carrying with it the head 28 and the work 29, the angular velocity of the work 29 being equal to the angular velocity of the master 55, considering the equal diameters of the gears 58 and 31.

As a means of disengaging the worm 40 from the segment gear 33 after the turntable 18 has moved ninety degrees in a counter-clockwise direction, an adjustable stop 65 is screw threaded into a block 66 suitably secured to the upper surface of the opening 15 (Figs. 7 and 8) at the forward end of the opening 15 (Figs. 7 and 8). An elongated member 67 is pivotally mounted on the top of turntable 18 by means of a pin 68, the member 67 being normally disposed parallel to the forward edge of the turntable until the end thereof is brought into abutment with the adjustable stop 65 (which will cause the member 67 to rotate in a clockwise direction about the pin 68). The member 67 on the upper surface carries a pin 69 serving as a stop for a second elongated member 70 disposed at right angles to the member 67 and pivotally mounted on the upper surface of the turntable 18 by means of a pin 71. A spring 72 connected at one end to the end of the member 67 and at the other end to the top surface of the turntable biases the member 67 in a counter-clockwise direction and serves to retain the stop 69 in tensional abutment with the member 70, as shown in full lines in Figs. 7 and 9. The member 70 is biased in a counter-clockwise direction by means of a spring 73 connected at one end to the member 70 and at the other end to the upper surface of the turntable. Thus, upon the member 67 coming into contact with the adjustable stop 65 (upon rotation of the turntable 18 ninety degrees), the member 67 will be rotated in a clockwise direction about the pin 68 against the action of spring 72, to move the stop 69 out of engagement with the member 70 and to permit the latter to be rotated in a counter-clockwise direction under the action of the spring 73, as shown in dotted outline in Fig. 7.

A plate 74 is pivotally mounted on the outer face of the bracket 36 by means of a bolt 75, the top portion of the plate 74 extending upwardly through the turntable 18 through an elongated opening 76 provided in the latter. The plate 74 is provided with an elongated vertical opening 77 within which the end of shaft 37 rides upon rotation of the plate 74 in a counterclockwise direction. This counterclockwise rotation of plate 74 is effected by means of a link 78 connected at one end to the top of plate 74 and at the other end to the end of the member 70. Thus, as the member 67 comes into abutment with the adjustable stop 65, and the stop 69 is moved out of abutment with the end of the member 70, the latter will rotate in a counterclockwise direction under the action of spring 73, pulling the plate 74 away from the gear segment 33 about the pivot 75, moving the shaft 37 in the elongated slot 42 away from the gear 33 and carrying the worm 40 out of engagement with the gear segment 33. Thus, the rotation of the turntable 18 will automatically cease when the former has been rotated through ninety degrees in a counterclockwise direction.

The work 29 shown is intended as golf ball mold blank, being substantially circular in outer lateral contour and having a hemispherical concave recess 79 in which face the required design is to be cut. It will be noted that the front circular edge 80 of the work 29 is aligned vertically with the front circular edge 57 of the master support 55. The ratio of the radius of the face 56 of the master support 55 relative to the radius of the work face 79 will, of course, vary according to the accuracy of the design to be produced.

On the face 56 of the master support 55 the master design 81 is secured, this master design being made up of a hemispherical brass lining 82 having soldered thereto a plurality of discs 83 of copper or brass. There may be a plurality of such master designs 81 adapted for ready use and depending upon the particular design to be cut, it being only necessary to position and secure by suitable means on the face 56 the appropriate master design 81. The individual master designs 81 may, of course, be varied by changing the position of the discs 83, for example, upon the application of heat thereto.

An overhanging rectangular plate 84 is secured to the upper surface of plate 12 adjacent the tongue 16 thereof by means of bolts 85. The plate 84 on the upper surface thereof is integrally formed with a dovetail-shaped ridge 86 (Fig. 13), the ridge 86 extending longitudinally of the plate parallel to the shaft 27. A bracket 87 is provided on its undersurface with a dovetail-shaped groove 88 cooperating with the ridge 86 whereby to slidably mount the bracket. The bracket 87 is also provided with an elongated slot 89 receiving therethrough a bolt 90 screwthreaded into the ridge 88 and plate 84, whereby to lock the position of the bracket 87 relative to the plate 84 at the desired setting.

The bracket 87 is provided with uprights 91 and 92, the rear face of each of the uprights 91 and 92 (Fig. 13) being provided with longitudinally aligned grooves 93. Upper and lower plates 94 and 95 (Fig. 11) are secured to the rear face of the upright 92 by means of screws 96, the lower edge of the plate 94 and the upper edge of the plate 95 extending vertically beyond the groove 93 whereby to retain a slide 97 moving in grooves 93 and having a semicircular central portion. The upright 91 is similarly provided with upper and lower plates 98 and 99 for the same purpose, the plates 98 and 99 being retained in position by screws 100.

The slide 97 is provided at each end with end walls 101 (Fig. 13) which serve as bearings for an elongated shaft 102.

The lower plate 99 is integrally formed with an arm 103 terminating in a head 104 adapted to abut an adjustable stop 105 screwthreaded into a bracket 106 integrally formed in the rear side of the slide 97 (Fig. 11), the stop 105 being integrally formed with an enlarged knurled head 107. Thus, by adjustment of the stop 105, the abutment therewith of the head 104 will limit the displacement of the slide 97 in a direction away from the upright 92, as will be obvious.

The slide 97 at one end is provided with a vertical cut out 108 (Figs. 1 and 13) to accommodate a gear 109 keyed to the shaft 102. As shown in Fig. 12, the slide 97 is integrally formed with an arm 110 which cooperates with an extension 111 of the adjacent end wall 101 to rotatably mount a shaft 112 disposed alongside and parallel to the shaft 102.

A second gear 113 is keyed to the shaft 112 in mesh with the gear 109. A tool head 114 is provided on the end of the shaft 112 and receives a cutting tool 115. This offset of the cutting tool 115 from the shaft 102 is necessary in order to permit the cutting tool to be rotated 90 degrees within the work 29, as will be apparent from a consecutive inspection of Figs. 9 and 7. Thus, upon rotation of the shaft 102, the gear 109 will rotate the gear 113 to rotate the shaft 112 and therewith the cutting tool 115.

A driven pulley 116 is keyed to the shaft 102 and is connected by the belt 117 to a suitable source of power, whereby to rotate the cutting tool 115, it being noted that the shaft 102 extends beyond the slide 97 to mount the pulley 116 adjacent the upright 92. The pulley 116 is provided with an elongated hub 118 extending outwardly from each side thereof. The hub 118 is provided on the inside thereof with a longitudinally extending, elongated keyway, not shown, which slidably receives an elongated key 119 formed on the shaft 102. Longitudinal displacement of the hub 118 is prevented at one end by abutment with the upright 92 and at the other end by abutment of this other end of hub 118 with an upright 120 secured to the end of bracket 87 by bolts 121.

A U-shaped arm 144 is fixedly secured at one end to plate 97 and extends around across the outer face of upright 120 to terminate in enlargement 145. A pin 146 is secured within enlargement 145 and slides in an opening 146' in upright 120. A member 123 is secured to arm 144 adjacent enlargement 145. The outer end of member 123 is provided with a vertical slit for a purpose which will hereinafter become clear.

A rod 124 passes through a suitable opening provided in the upright 120 near the top thereof and is secured in this position by the set screw 125, the rod 124 being aligned vertically with the member 123 and integrally formed on its outer end with an enlargement 126. The enlargement 126 is similarly provided with a vertical slot permitting the upper end of a connecting arm 127 to be pivotally connected within the enlargement 126 by means of a removable pin 128. The connecting arm 127 is also pivotally connected within the slot of member 123 by means of a pin 129.

An angle bracket 130 is secured to the undersurface of the overhanging portion of the plate 84 by means of bolts 131, the bracket 130 being integral with a reinforcing rib 132 and terminating at its lower end in a horizontal portion 133 (Fig. 1). The horizontal portion 133 at each end is integrally formed with depending bearings 134 and 135 aligned with each other longitudinally and which rotatably mount a shaft 136. The outer end of the shaft 136 extends beyond the bearing 134 and is pivotally connected to the bottom of the arm 127 by means of slotted enlargement 137 and a pin 138. A collar 139 is keyed to the shaft 136 intermediate the bearings 134 and 135 and abuts an expansion spring 140 sleeving the shaft 136 intermediate the collar 139 and bearing 134, whereby to normally urge the shaft 136 towards the bearing 135.

A laterally extending bracket 141 is fixedly carried by the shaft 136 and screw threadedly receives an adjustable stop 142 adapted to abut a stop 143 integrally formed in the upper face of the horizontal extension 133 whereby to limit the displacement of the shaft 136 under the action of the spring 140 in an obvious manner.

The end of the shaft 136 remote from the spring 140 extends into the center of master design 81 and is provided at this end with a cylindrical bore 147 which receives the shank 148 of a bifurcated bracket 149 which rotatably mounts a roller 150. (Figs. 1 and 3.)

As shown in Figs. 1 and 3, the master design 81 is provided with the grooves 151 surrounding the discs 83 which define the design ultimately cut in the work 29. In these grooves 151 the roller 150 is adapted to travel. The roller 150 will be resiliently retained within the grooves 151 by means of the spring 140. It will be noted from Fig. 3 that the roller 150, when in the grooves 151, is prevented from actually touching the lining 82 by means of the adjustable stop 142 in abutment with the stop 143, resulting in a perfect sphere on the work face 79. During the routing operation of the machine, after the blank 29 is secured in place in the head 28, the required master design 81 is secured within the master support 55, the roller 150 is located in the grooves 151, the belt 117 has been connected to the pulley 116, and the motor 61 is driving the master support 55 and the work 29 about the shafts 53 and 27, respectively, with the turntable 18 moving from the initial position of Fig. 9 toward the position of Fig. 7, the cutting tool (Fig. 3) 115 having a cutting edge 152 will be moved into the work face 79 by the spring 140 to cut out the space between the pimples or bumps 153. When the roller 150 moves across a disc 83 the cutting tool 115 and the cutting edge 152 thereof will, of course, be moved away from the work face 79 against the action of spring 140, to provide the rough pimples or bumps 153 of Fig. 5. Thus, the routing operation is entirely automatic, the work face 79 rotating in synchronization with the master design 81 and the cutting tool 115 moving in and out of the work face 79 under the action of the roller 150. This operation will be followed until the entire design formed in the master design 81 has been routed in the work face 79. The gearing in such that when the turntable 18 has moved from the initial position of Fig. 9 to the final position of Fig. 7 (at which time the worm 40 will be disengaged from the gear segment 33), the entire hemispherical face 79 will be routed with the rough bumps or pimples 153. Thus, the entire operation is automatic and requires no manual motions or adjustments other than the insertion of the work, the connection of the belt 117 and the starting of the motor 61.

It will be noted that during the routing operation the adjustable stop 105 is out of contact with the stop 104 and that the inward movement of the cutting tool 115 is limited not by the stop 105 but by the stop 142.

For the finishing operation, the cutting tool 115 is removed and replaced by a cutting tool 154 (Fig. 6). The bracket 149 carrying roller 150 is removed from the end of the shaft 136 by pulling the shank 148 out of the bore 147 and is instead replaced by an indexing tool 155 provided with a shank 156 adapted to fit into the bore 147 and terminating at its other end in an extension 157 of lesser diameter than the body portion 155. The discs 83 at their centers are provided with bores 158 which extend through the lining 82 and partially through the master support 55 and are adapted to receive therewithin the extensions 157 (Fig. 4), whereby to index the finishing tool 154, which is then moved into the work face 79 in a manner to be described directly.

During the finishing operation, the pin 128 is removed and the adjustable stop 142 is screwed to an inoperative position (Fig. 4) whereby the same will not be in contact with the stop 143 when the extension 157 is within the bores 158. In this case the inward movement of the cutting tool 154 is limited by the stop 105 in abutment with the stop 104. The cutting tool will be moved into the position limited by stop 105 and out again manually until the cutting tool has finished the final bumps or pimples 153a.

During this finishing operation, the motor 61 will be disengaged or rendered inoperative by the removal of the chain 64, thus permitting the master support 55 and the work 29 to be manually rotated about the shafts 53 and 27, respectively, and the turntable 18 to be revolved manually. Preferably a magnetic clutch, not shown, will be provided in the motor 61 to facilitate the disconnecting of the latter.

A feed conduit 159 (Fig. 1) is mounted with its mouth adjacent to the cutting end of the tool 115 to feed lubricating oil on to the cutting tool and work during the above operations. The feed conduit 159 is connected to a reservoir or pump, not shown, and to which the waste oil is returned by the conduit 22 previously referred to, providing a continuous lubricating system.

While I have shown but one embodiment of my invention, I do not wish to be confined to the embodiment shown, but what I desire to cover by Letters Patent is set forth in the appended claims.

What is claimed is:

1. In a machine for cutting a design in a substantially hemispherical surface, the combination with a support, means for pivotally mounting said support, means on said support for receiving the work, said support being rotatable about a substantially vertical axis and a substantially horizontal axis with all points of the work face being substantially equidistant from a point common to the centers of rotation of the support, of a design master mounted within a substantially hemispherical face and rotatably mounted below said support, the axis of rotation of said hemispherical face being substantially parallel to the horizontal axis of said support, all points in said hemispherical face being equi-distantly spaced from the vertical axis of said support, a cutting tool slidably mounted on said frame for engaging said work and means cooperating with said design master to guide said cutting tool relative to the work.

2. In a machine for cutting a design in a substantially hemispherical surface, the combination with a support rotatable about axes at right angles to each other, of means for supporting the work at the intersection of the axes of the rotation of the support, a design master mounted within a hollow substantially hemispherical face and rotatably mounted below said support, the axis of rotation of said hemispherical face being substantially parallel to the horizontal axis of said support, all points in said hemispherical face being equi-distantly spaced from a downward extension of the vertical axis of rotation of said support, a cutting tool slidably mounted on said frame with its longitudinal axis substantially parallel to the horizontal axis of rotation of said support for engaging said work, and means cooperating with said design master to guide said cutting tool relative to the work.

3. In a mold cutting machine, the combination with a frame of a plate pivotally mounted on said frame, a support for the work, a support for a design master, said work support being pivotally mounted on the top of said plate, said design master support being pivotally mounted below said plate, the work being equidistantly spaced from the intersection of the axes of rotation of said plate and said work, said master design support being equi-distantly spaced from a downward extension of the axis of said plate, gear means interconnecting said master design support and said work support adapted to rotate said work and master supports together at the same angular velocity, second gear means in mesh with said first gear means adapted to rotate said plate, means for rotating said first gear means, a cutting tool slidably mounted on said frame for engaging said work, the axis of rotation of said cutting tool being substantially parallel to the axis of rotation of said support and design master, means for rotating said cutting tool and means cooperating with said design master to guide said cutting tool relative to the work.

4. In a machine for cutting a design in the concave face of a golf ball mold blank, the combination with a frame having a horizontal portion, of a support for the golf ball mold blank, a design master formed within a hemispherical base, a support for the design master rotatably mounted below said horizontal portion, said mold blank support being rotatably mounted above said horizontal portion, the axes of rotation of said mold blank support and said master support being substantially parallel to each other and aligned vertically, said horizontal portion being rotatable about a vertical axis, the work face of said mold blank being equi-distantly spaced from the intersection of the vertical axis of rotation of said horizontal portion and the horizontal axis of rotation of said mold blank support, the hemispherical face of said master design support being equi-distantly spaced from a downward extension of the vertical axis of said horizontal portion, gear means interconnecting said mold blank and master supports for rotation about their axes, means for moving said gear means, second gear means in mesh with said first gear means for rotating said plate about its vertical axis, a cutting tool rotatably mounted above said frame and adapted for longitudinal sliding movement, and means cooperating with said design master to guide said cutting tool longitudinally relative to the work.

5. In a machine for cutting a design in the concave face of a golf ball mold blank, the combination with a frame having a horizontal portion, of a support for the golf ball mold blank, a design master formed within a hemispherical base, a support for the design master rotatably mounted below said horizontal portion, said mold blank support being rotatably mounted above said horizontal portion, the axes of rotation of said mold blank support and said master support being substantially parallel to each other and aligned vertically, said horizontal portion being rotatable about a vertical axis, the work face of said mold blank being equi-distantly spaced from the intersection of the vertical axis of rotation of said horizontal portion and the horizontal axis of rotation of said mold blank support, the hemispherical face of said master design support being equi-distantly spaced from a downward extension of the vertical axis of said horizontal portion, gear means interconnecting said mold blank and master supports for rotation about their axes, means for moving said gear means, second gear means in mesh with said first gear means for rotating said plate about its vertical axis, a cutting tool rotatably mounted above said frame and adapted for longitudinal sliding movement, and means cooperating with said design master to guide said cutting tool longitudinally relative to the work, and automatic means for disengaging said second gear means whereby to stop the rotation of said plate after the latter has moved substantially ninety degrees.

6. In a machine for cutting a design in the concave face of a golf ball mold blank, the combination with a frame having a horizontal portion, of a support for the golf ball mold blank, a design maser formed within a hemispherical base, a support for the design master rotatably mounted below said horizontal portion, said mold blank support being rotatably mounted above said horizontal portion, the axes of rotation of said mold blank support and said master support being substantially parallel to each other and aligned vertically, said horizontal portion being rotatable about a vertical axis, the work face of said mold blank being equi-distantly spaced from the intersection of the vertical axis of rotation of said horizontal portion and the horizontal axis of rotation of said mold blank support, the hemispherical face of said master design support being equi-distantly spaced from a downward extension of the vertical axis of said horizontal portion, gear means interconnecting said mold blank and master supports for rotation, about their axes, means for moving said gear means, second gear means in mesh with said first gear means for rotating said plate about its vertical axis, a cutting tool rotatably mounted above said frame and adapted for longitudinal sliding movement, and means cooperating with said design master to guide said cutting tool longitudinally relative to the work, said guide means cooperating with said design master comprising a substantially horizontal shaft slidably mounted below said plate with one end of said shaft aligned with the center of said hemispherical design master, roller means at the end of said shaft adapted to ride the design master, spring means urging said roller means toward the design master and a vertical link pivotally connected at its upper end to the frame and at its lower end to the outer end of said shaft, said link being pivotally connected to one end of said slidably mounted cutting tool whereby to urge the cutting edge of the latter against the mold blank in conformance with the master design.

7. In a machine for cutting a design in the concave face of a golf ball mold blank, the combination with a frame having a horizontal portion, of a support for the golf ball mold blank, a design master formed within a hemispherical base, a support for the design master rotatably mounted below said horizontal portion, said mold blank support being rotatably mounted above said horizontal portion, the axes of rotation of said mold blank support and said master support being substantially parallel to each other and aligned vertically, said horizontal portion being rotatable about a vertical axis, the work face of said mold blank being equi-distantly spaced from the intersection of the vertical axis of rotation of said horizontal portion and the horizontal axis of rotation of said mold blank support, the hemispherical face of said master design support being equi-distantly spaced from a downward extension of the vertical axis of said horizontal portion, gear means interconnecting said mold blank and master supports for rotation about their axes, means for moving said gear means, second gear means in mesh with said first gear means for rotating said plate about its vertical axis, a cutting tool rotatably mounted above said frame and adapted for longitudinal sliding movement, and means cooperating with said design master to guide said cutting tool longitudinally relative to the work, said guide means cooperating with said design master comprising a substantially horizontal shaft slidably mounted below said plate with one end of said shaft aligned with the center of said hemispherical design master, roller means at the end of said shaft adapted to ride the design master, spring means urging said roller means toward the design master and a vertical link pivotally connected at its upper end to the frame and at its lower end to the outer end of said shaft, said link being pivotally connected to one end of said slidably mounted cutting tool whereby to urge the cutting edge of the latter against the mold blank in conformance with the master design, and adjustable stop means for limiting the displacement of said shaft towards the design master so that said roller means will be freely spaced from the latter when in the grooves thereof whereby to cut a perfect hemispherical work face.

8. A mold cutting machine of the character described, including the combination of a frame and a plate pivotally mounted thereon, a hollow support for the work pivotally mounted on the plate adapted to receive the work and also adapted to have the work ejected by a rod inserted through said hollow support at will, a second support for a design master also pivotally mounted upon said plate, a cutting tool slidably mounted on said frame for engaging the work, and guide means co-operating with said design master effective to guide the cutting tool relatively to said work, said second support being hollow in such fashion as to receive therewithin said guide means co-operating with said design master.

9. A mold cutting machine for cutting a design in the concave surface of a golf ball mold blank, including the combination of a frame having a horizontal portion, a hollow mold blank support pivotally mounted on the horizontal portion of the frame adapted to receive the mold blank or work and to have the latter ejected at will by a rod inserted through said hollow mold blank support, a design master formed upon the interior of a substantially hemispherical concave base, a second support for the design master also pivotally mounted on the horizontal portion of said frame below the mold blank support, a cutting tool for cutting the concave surface of said golf ball mold blank, means for rotatably mounting the mold blank support and the second support for rotation about a vertical axis, and means cooperating with said design master effective to guide said cutting tool relatively to said work.

10. A mold cutting machine according to claim 9, wherein the mold blank is mounted above the plate and the design master support is mounted beneath the same plate and both supports are vertically aligned to be rotatable upon the same vertical axis in such fashion as to locate the design master support within the frame upon which the plate is rotatably mounted and the mold blank exteriorly above said frame to allow ready access thereto.

References Cited in the file of this patent

UNITED STATES PATENTS

| | | |
|---|---|---|
| 2,058,395 | Atti | Oct. 27, 1936 |
| 2,330,566 | Edmonds et al. | Sept. 28, 1943 |